Aug. 2, 1938.　　　　F. L. WATSON　　　　2,125,702
BRAKE ACTUATING TRAILER COUPLING
Filed May 29, 1937
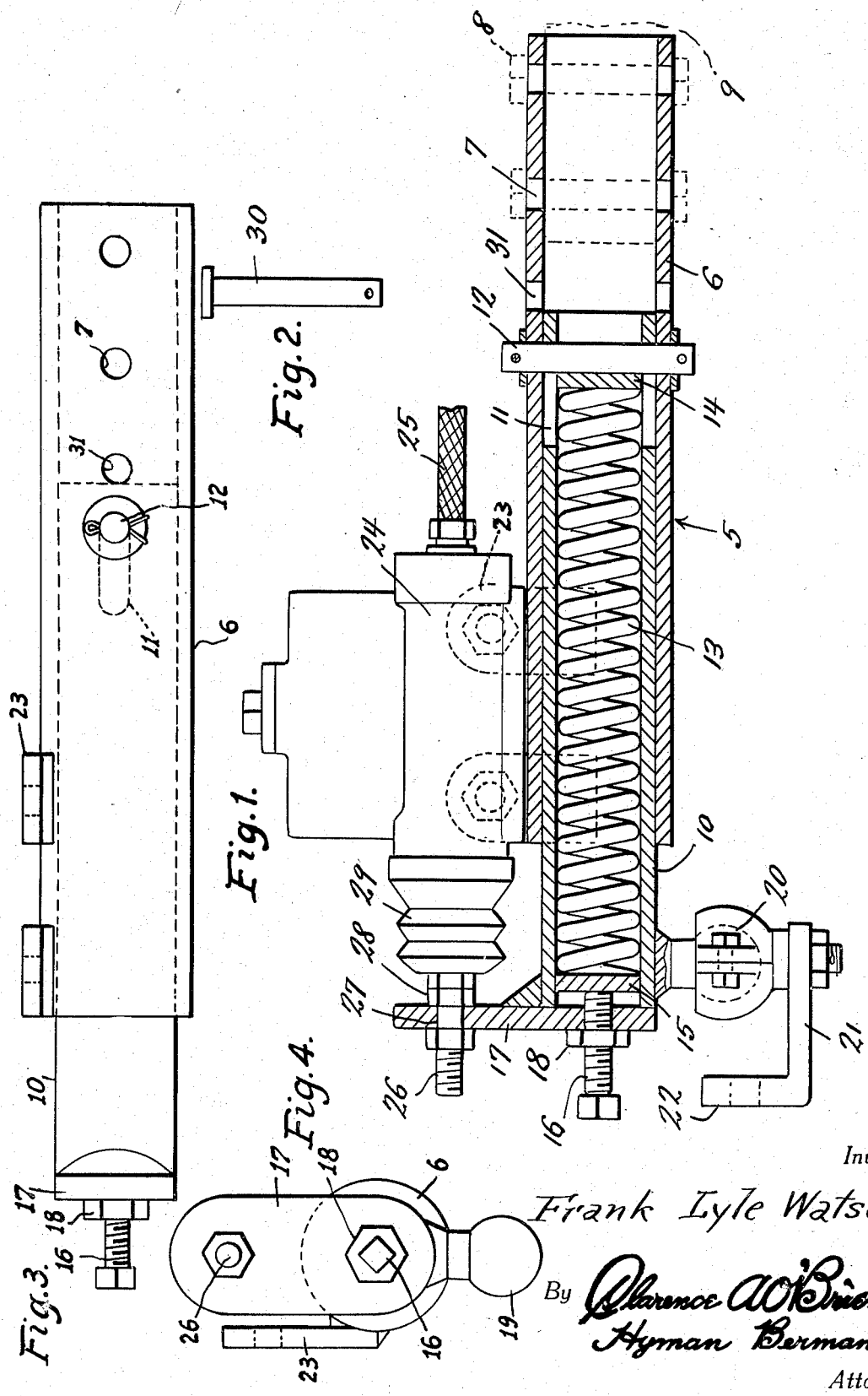
Inventor
Frank Lyle Watson
By Clarence A. O'Brien
　　Hyman Berman
　　　　Attorneys Patented Aug. 2, 1938

2,125,702

UNITED STATES PATENT OFFICE 2,125,702

BRAKE ACTUATING TRAILER COUPLING

Frank L. Watson, Walled Lake, Mich.

Application May 29, 1937, Serial No. 145,613

3 Claims. (Cl. 188—142)

The present invention relates to trailer couplings and has for its principal object to provide means associated therewith for actuating the brake of the trailer upon a relative decrease in the momentum of the pulling vehicle, as by the application of the brakes thereof, or by an increase in the momentum of the trailer relative to the pulling vehicle, as by traveling downgrade.

One of the important objects of the present invention is to provide a trailer coupling of this character embodying a pair of telescoping coupling members having spring means for maintaining the same in projected position and having a hydraulic brake actuating cylinder operatively associated therewith to apply the brakes of the trailer upon a telescoping movement of the members.

A further object is to provide a device of this character of simple and practical construction, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which:—

Figure 1 is a longitudinal sectional view through the coupling.

Figure 2 is an elevational view of the removable reverse locking pin.

Figure 3 is a top plan view of the coupling with the hydraulic brake operating cylinder removed.

Figure 4 is an end view of the coupling.

Referring now to the drawing in detail, wherein for the purpose of illustration I have disclosed a preferred embodiment of the invention, the numeral 5 designates a coupling generally which embodies an outer sleeve member 6 having openings 7 adjacent its rear end for receiving bolts 8 to secure the trailer tongue 9 in position in the rear end of the sleeve. A tubular coupling member 10 is telescopically positioned within the forward end of the sleeve 6, said tubular member having aligned slotted openings 11 in its walls adjacent its inner end within which a pin 12 is positioned, said pin being fixedly secured to the sleeve 6.

An expansible coil spring 13 is positioned within the tubular member 10, the rear end of the spring abutting a plate 14 which engages the pin 12 and the front end of the spring abuts a plate 15 slidably positioned within the forward end of the tubular member and engaged by a set screw 16 threaded through a bracket 17 secured to the front end of the tubular member, said set screw being operable to move the plate 15 longitudinally within the tubular member 10 to adjust the tension of the spring 13. A lock nut 18 is provided for the set screw to secure the same in adjusted position.

To the underside of the forward end of the tubular member 10 is secured a ball 19 clamped within a socket 20 secured to a bracket 21 having an upturned forward end 22 for securing the same to a pulling vehicle.

To one side of the sleeve 6, adjacent its forward end, is arranged a pair of upstanding brackets 23 to which a hydraulic brake cylinder 24 is secured, said brake cylinder being of conventional construction and having a flexible pipe 25 attached to its rear end and a piston rod 26 projecting from its forward end for actuating the usual piston within the cylinder for the purpose of applying fluid pressure to the brake of the trailer through the pipe 25. The forward end of the piston rod 26 is threaded and inserted through an opening 27 in the bracket 17 and adjustably secured thereto by nuts 28. A flexible cover 29 encloses the piston rod adjacent the cylinder. Under normal operating conditions the various parts will occupy a position as shown in Figure 1 of the drawing with the pin 12 occupying a position at the rear end of the slot 11 of the tubular member 10, in which position the brakes of the trailer will be released. Upon a relative forward movement of the trailer the sleeve 6 will be projected forwardly against the tension of the spring 13 whereby the piston rod 26 will be caused to move rearwardly in the cylinder 24 in a manner to cause an application of the trailer brakes.

When it is desired to back up the trailer a removable pin 30 is inserted through aligned openings 31 in the sleeve 6 immediately rearwardly of the rear end of the tubular member 10 whereby telescoping movement of the parts is prevented.

It is believed the details of construction and operation of the device will be readily understood from the foregoing without any further detailed explanation.

The present embodiment of the invention has been described in considerable detail merely for the purposes of exemplification since in actual practice it attains the features of advantage enumerated as desirable in the statement of the invention and the above description.

Having described the invention what is claimed as new is:—

1. A trailer coupling comprising a sleeve connected with the trailer, a tubular member telescopically mounted in the forward end of the sleeve, a pin and slot connection between the sleeve and tubular member, a coil spring mounted in the tubular member and bearing against the pin to yieldably maintain the same at the rear end of the slot, means connecting the tubular member to the pulling vehicle and a hydraulic brake actuating mechanism fixedly secured to the sleeve and operatively connected to the tubular member for actuating the mechanism to apply the brakes upon a rearward movement of the tubular member relative to the sleeve.

2. A trailer coupling comprising a sleeve rigidly secured to the tow pole of the trailer, a tubular member telescopically mounted in the forward end of the sleeve, a pin and slot connection between the sleeve and tubular member, a coil spring mounted in the tubular member and bearing against the pin to yieldably maintain the same at the rear end of the slot, means for connecting the tubular member to the pulling vehicle, a hydraulic brake actuating cylinder fixedly secured to the sleeve, a piston rod projecting from the end of the cylinder and a bracket connecting the piston rod to the tubular member for actuating the rod upon a rearward telescoping movement of the tubular member.

3. A trailer coupling comprising a sleeve rigidly secured to the tow pole of the trailer, a tubular member telescopically mounted in the forward end of the sleeve, a pin and slot connection between the sleeve and tubular member, a coil spring mounted in the tubular member and bearing against the pin to yieldably maintain the same at the rear end of the slot, means for connecting the tubular member to the pulling vehicle, a hydraulic brake actuating cylinder fixedly secured to the sleeve, a piston rod projecting from the end of the cylinder, a bracket connecting the piston rod to the tubular member for actuating the rod upon a rearward telescoping movement of the tubular member, and means movably carried by the sleeve for locking the tubular member against rearward movement.

FRANK L. WATSON.